US012704383B2

(12) United States Patent
Schpok

(10) Patent No.: US 12,704,383 B2
(45) **Date of Patent: *Aug. 11, 2026**

(54) SYSTEMS AND METHODS FOR USING VISUAL LANDMARKS IN INITIAL NAVIGATION

(71) Applicant: GOOGLE LLC, Mountain View, CA (US)

(72) Inventor: Joshua S. Schpok, Seattle, WA (US)

(73) Assignee: Google LLC, Mountain View, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/789,392

(22) Filed: Jul. 30, 2024

(65) Prior Publication Data

US 2024/0393128 A1 Nov. 28, 2024

Related U.S. Application Data

(63) Continuation of application No. 18/183,947, filed on Mar. 14, 2023, now Pat. No. 12,050,109, which is a
(Continued)

(51) Int. Cl.
*G01C 21/36* (2006.01)
*G06F 18/24* (2023.01)
(Continued)

(52) U.S. Cl.
CPC ..... *G01C 21/3644* (2013.01); *G01C 21/3635* (2013.01); *G01C 21/3647* (2013.01);
(Continued)

(58) Field of Classification Search
CPC ............ G01C 21/3644; G01C 21/3635; G01C 21/3647; G01C 21/3664; G01C 21/3691;
(Continued)

(56) References Cited

U.S. PATENT DOCUMENTS 6,256,581 B1 7/2001 Fujii et al.
6,317,684 B1 * 11/2001 Roeseler ............. G08G 1/0969 701/428
(Continued)

FOREIGN PATENT DOCUMENTS

CN 1880918 A 12/2006
CN 102168982 A 8/2011
(Continued)

OTHER PUBLICATIONS

"Cityscapes Dataset," (2016). Retrieved from the Internet at: URL:https://www.cityscapes-dataset.com/.
(Continued)

*Primary Examiner* — Gertrude Arthur Jeanglaude
(74) *Attorney, Agent, or Firm* — Lerner David LLP

(57) ABSTRACT

A route from a current location of a portable device to a destination is determined, where the route includes a sequence of directed sections. Navigation instructions to guide a user of the portable device along the route to the destination are generated. To this end, candidate navigation landmarks perceptible within a 360-degree range of the current location of the portable device are identified using (i) one or more metrics of observability, prominence, and uniqueness and (ii) a user preference related to a type of landmark, and an initial instruction in the navigation instructions is generated and provided via a user interface of the portable device. The initial instruction references the selected navigation landmark.

20 Claims, 7 Drawing Sheets

Related U.S. Application Data continuation of application No. 16/989,853, filed on Aug. 10, 2020, now Pat. No. 11,604,077, which is a continuation of application No. 16/237,629, filed on Dec. 31, 2018, now Pat. No. 10,739,158, which is a continuation of application No. 15/335,100, filed on Oct. 26, 2016, now Pat. No. 10,168,173.

(51) Int. Cl.
*G06T 7/70* (2017.01)
*G06V 20/56* (2022.01)
*G06F 3/04817* (2022.01)
*G06F 3/0482* (2013.01)
*G06F 3/0488* (2022.01)

(52) U.S. Cl.
CPC ..... *G01C 21/3664* (2013.01); *G01C 21/3691* (2013.01); *G06F 18/24* (2023.01); *G06T 7/70* (2017.01); *G06V 20/56* (2022.01); *G06F 3/04817* (2013.01); *G06F 3/0482* (2013.01); *G06F 3/0488* (2013.01); *G06T 2200/24* (2013.01); *G06T 2215/16* (2013.01)

(58) Field of Classification Search
CPC ... G06T 7/70; G06T 2200/24; G06T 2215/16; G06V 20/56; G06F 18/24; G06F 3/04817; G06F 3/0482; G06F 3/0488
See application file for complete search history.

(56) References Cited

U.S. PATENT DOCUMENTS

| | | | | |
|---|---|---|---|---|
| 7,480,567 | B2 | 1/2009 | Suomela et al. | |
| 7,831,387 | B2 | 11/2010 | Golding et al. | |
| 7,920,968 | B2 | 4/2011 | Chapin et al. | |
| 8,478,515 | B1 | 7/2013 | Foucher et al. | |
| 8,532,678 | B2 * | 9/2013 | Geelen | G08G 1/005 455/457 |
| 8,538,391 | B2 * | 9/2013 | Geelen | G08G 1/0969 715/810 |
| 10,168,173 | B2 * | 1/2019 | Schpok | G01C 21/3691 |
| 10,739,158 | B2 | 8/2020 | Schpok | |
| 11,604,077 | B2 | 3/2023 | Schpok | |
| 2002/0120622 | A1 | 8/2002 | Hasegawa et al. | |
| 2004/0107044 | A1 | 6/2004 | Hasegawa et al. | |
| 2004/0249565 | A1 | 12/2004 | Park | |
| 2005/0288859 | A1 | 12/2005 | Golding et al. | |
| 2010/0273505 | A1 | 10/2010 | Moller et al. | |
| 2011/0098910 | A1 | 4/2011 | Saarimaki et al. | |
| 2011/0313653 | A1 | 12/2011 | Lindner | |
| 2012/0105476 | A1 | 5/2012 | Tseng | |
| 2015/0112593 | A1 | 4/2015 | Kandangath et al. | |

FOREIGN PATENT DOCUMENTS

| | | | |
|---|---|---|---|
| CN | 103968846 | A | 8/2014 |
| CN | 105814615 | A | 7/2016 |
| CN | 105890608 | A | 8/2016 |
| EP | 1 965 172 | A1 | 9/2008 |
| JP | H09-304090 | A | 11/1997 |
| JP | 2000-046567 | A | 2/2000 |
| JP | 2002-260160 | A | 9/2002 |
| JP | 2005-99418 | A | 4/2005 |
| JP | 2007-264472 | A | 10/2007 |
| JP | 2007-531004 | A | 11/2007 |
| JP | 2008-076374 | A | 4/2008 |
| JP | 2016-099270 | A | 5/2016 |
| JP | 2016-153906 | A | 8/2016 |
| WO | WO-2005/104039 | A2 | 11/2005 |
| WO | WO-2011/048257 | A1 | 4/2011 |
| WO | WO-2017/024308 | A1 | 2/2017 |

OTHER PUBLICATIONS

"Physically Grounded Scene Interpretation," Retrieved from the Internet at :URL:http://dhoiem.cs.illinois.edu/projects/interpretation_project.html.

American Psychological Association, "Particularly Exciting Experiments in Psychology, The Role of Landmarks in Navigation," Dec. 4, 2014, retrieved from the Internet Oct. 26, 2016, http://www.apa.org/pubs/highlights/peeps/issue-35.aspx.

Baus et al., Auditory perceptible landmarks in mobile navigation, 2007 International Conference on Intelligent User Interfaces, 302-304 (Jan. 2007).

Beeharee et al., "A Natural Wayfinding—Exploiting Photos in Pedestrian Navigation Systems," Mobile HCI'06, Helsinki, Finland, pp. 81-88, 2006.

Brenner et al., "Extracting Landmarks for Car Navigation Systems Using Existing GIS Databases and Laser Scanning," ISPRS Archives, vol. XXXIV, Part3/W8, Munich, Germany, Sep. 2003.

Brubaker, M., Geiger, A. & Urtasun, R., 2015. Map-Based Probabilistic Visual Self-Localization. IEEE transactions on pattern analysis and machine intelligence, pp. (99), pp. 1-1. Available at: URL:http://ieeexplore.ieee.org/xpl/articleDetails.jsp?arnumber=7152950.

Chen, L.-C. et al., 2015. Semantic Image Segmentation with Deep Convolutional Nets and Fully Connected CRFs. In ICLR. Available at: http://arxiv.org/abs/1412.7062.

Eigen, D. & Fergus, R., 2015. Predicting Depth, Surface Normals and Semantic Labels with a Common Multi-Scale Convolutional Architecture. In ICCV. Available at: http://arxiv.org/abs/1411.4734.

Examination Report for Application No. 20181744.2, dated Sep. 27, 2021.

Extended European Search Report for Application No. 20181744.2, dated Aug. 6, 2020.

Extended European Search Report for Application No. 23154082.4, dated May 4, 2023.

First Examination Report for India Application No. 201847022208, dated Dec. 31, 2020.

First Examination Report for India Application No. 20214026779, dated Jun. 14, 2022.

Harris et al., "Digital Map Dependent Functions of Automatic Vehicle Location Systems," IEEE, CH2675-7/88/0000-0079, pp. 79-88, 1988.

International Search Report and Written Opinion for Application No. PCT/US2017/056254, dated Jan. 22, 2018.

Kainulainen et al., Soundmarks in Spoken Route Guidance, Proceedings of the 13th International Conference on Auditory Display, 107-111 (Jun. 2007).

Kray et al., "Presenting Route Instructions on Mobile Devices," IUI'03, Miami, Florida, pp. 117-125, 2003.

Li, G. & Yu, Y., 2015. Visual Saliency Based on Multiscale Deep Features. In CVPR. Available at: http://arxiv.org/abs/1503.08663.

Notice of Reasons for Rejection for Japanese Application No. 2019-039718, dated Apr. 10, 2020.

Notice of Reasons for Rejection for Japanese Application No. 2021-007926, dated Nov. 8, 2021.

Office Action for Chinese Application No. 201780007032.6, dated Dec. 2, 2022.

Office Action for European Patent Application No. 23154082.4, dated Apr. 5, 2023.

Ren, S. et al., 2015. Faster R-CNN: Towards Real-Time Object Detection with Region Proposal Networks. In NIPS. Available at: http://arxiv.org/abs/1506.01497.

Search and Examination Report for Application No. GB1717605.8, dated Mar. 14, 2018.

Steck et al., "The Role of Global and Local Landmarks in Virtual Environment Navigation," The Massachusetts Institute of Technology, Presence, vol. 9, No. 1, pp. 69-83, Feb. 2000.

Szegedy, C. et al., 2014. Scalable, High-Quality Object Detection. arXiv [cs.CV]. Available at: http://arxiv.org/abs/1412.1441.

Tribune Content Agency, "Microsoft's Inclusive Design," (2016). Retrieved from the Internet at: URL:http://tribunecontentagency.com/article/microsoft039s-inclusive-design/.

(56) References Cited

OTHER PUBLICATIONS

Wayfinder: Open Standard for audio-based wayfinding, ITU-T Draft, Study Period 2013-2016, International Telecommunication Union, iptv-gsi: 1-52 (May 2016).
Zeeshan Zia, M., Stark, M. & Schindler, K., 2014. Towards Scene Understanding with Detailed 3D Object Representations. International journal of computer vision, 112(2), pp. 188-203. Available at: http://arxiv.org/abs/1411.5935.
Office Action for Chinese Patent Application No. 202311051255.6 dated Mar. 28, 2026. 11 pages.

* cited by examiner

SYSTEMS AND METHODS FOR USING VISUAL LANDMARKS IN INITIAL NAVIGATION

CROSS-REFERENCE TO RELATED APPLICATIONS

This application is a continuation of U.S. patent application Ser. No. 18/183,947, filed Mar. 14, 2023; which is a continuation of U.S. patent application Ser. No. 16/989,853, filed Aug. 10, 2020; which is a continuation of U.S. patent application Ser. No. 16/237,629, filed Dec. 31, 2018; which is a continuation of U.S. patent application Ser. No. 16/237,629, filed Oct. 26, 2016, the entire disclosures of which are hereby expressly incorporated by reference herein.

FIELD OF THE DISCLOSURE

The present disclosure relates to navigation instructions and, in particular, to using imagery in navigation instructions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigation systems that automatically route drivers, bicyclists and pedestrians between geographic locations generally utilize indications of distance, street names, building numbers, etc. to generate navigation instructions based on the route. For example, these systems can provide to a driver such instructions as “proceed for one-fourth of a mile, then turn right onto Maple Street.” To users who are en route to a destination, a portable component of the navigation system can provide relative navigation instructions, i.e., instructions that are based on the direction of the movement. Examples of such navigation instructions include “turn left onto Main Street.” However, at the beginning of navigation, when the user is stationary and there is no direction of movement yet, the navigation systems in general provide absolute directions such as “go North on State Street.” Users can find absolute directions difficult to use, as they do not always know their orientation. However, it is difficult for a portable device to determine its operation or heading while the portable device is at rest.

SUMMARY

Generally speaking, the system of this disclosure identifies candidate navigation landmarks at the initial location of a portable device within a 360-degree range of the location. The candidate navigation landmarks can be visible within the 360-degree view, audible within the 360-degree range, or otherwise perceptible in any direction from the initial location. The system then generates initial navigation instructions referencing one or several of these landmarks, without limiting the selection to those landmarks that are disposed in the direction of initial travel. The system can generate such initial navigation instructions when the portable device is at rest, without relying on the sensors of the portable device to determine the current orientation of the portable device or the user. In some cases, the system generates initial navigation instructions that reference landmarks that will be behind the user once he or she commences travel. For example, the initial navigation instruction can be “walk away from the fountain and toward the hill.” Moreover, the landmark(s) the system selects need not be proximate and can include far-away natural objects such as mountains as well as artificial structures such as bridges, towers, tall buildings, etc. Using crowdsourcing or automated techniques, the system also can identify and reference in initial navigation instructions auditory landmarks, e.g., “walk toward the music” if an outdoor concert is reported at a nearby location.

An example embodiment of these techniques is a method for providing initial navigation guidance, which at least partially can be executed by one or more processors. The method includes determining a route from a current location of a portable device to a destination, where the route includes a sequence of directed sections, and generating navigation instructions to guide a user of the portable device along the route to the destination. Generating the navigation instructions includes identifying candidate navigation landmarks perceptible within a 360-degree range of the current location of the portable device, selecting, from among the candidate navigation landmarks, a navigation landmark disposed in a direction substantially opposite to the direction of the first one in the sequence of directed sections, generating an initial instruction in the navigation instructions, the initial instruction referencing the selected navigation landmark, and causing the initial navigation instruction to be provided via a user interface of the portable device.

Another example embodiment of these techniques is a portable computing device including a positioning module, a user interface module, processing hardware coupled to the positioning module and the user interface module, and a non-transitory memory readable by the processing hardware. The memory stores instructions that, when executed by the processing hardware, cause the portable computing device to obtain navigation instructions for guiding a user to a destination along a route that includes a sequence of directed sections, where the navigation instructions include an initial navigation instruction that references a navigation landmark disposed in a direction substantially opposite to the direction of the first one in the sequence of directed sections, and provide the initial navigation instruction via the user interface module.

Another example embodiment of these techniques is a non-transitory computer-readable medium storing thereon instructions for providing initial navigation guidance. The instructions, when executed by one or more processors, cause the one or more processors to determine a route from a current location of a portable device to a destination, the route including a sequence of directed sections and generate navigation instructions to guide a user of the portable device along the route to the destination. To generate the navigation instructions, the instructions cause the one or more processors to identify candidate navigation landmarks perceptible within a 360-degree range of the current location of the portable device, select a navigation landmark disposed in a direction substantially opposite to the direction of the first one in the sequence of directed sections, and generate an initial instruction in the navigation instructions, the initial instruction referencing the selected navigation landmark. The instructions further cause the one or more processors to provide the initial navigation instruction via a user interface of the portable device.

Another example embodiment of these techniques is a non-transitory computer-readable medium storing thereon instructions for providing initial navigation guidance. The instructions, when executed by one or more processors, cause the one or more processors to receive a request for navigation instructions to guide a user of a portable computing device to a destination; in response to the request, obtain a route from a current location of a portable device to the destination, the route including a sequence of directed sections; obtain navigation instructions to guide a user of the portable device along the route to the destination, where the navigation instructions include an initial navigation instruction that references a navigation landmark disposed in a direction substantially opposite to the direction of the first one in the sequence of directed sections; and provide the initial navigation instruction for output via a user interface of the portable device.

Other example embodiments of these techniques are methods and systems that select a navigation landmark disposed in a direction substantially aligned with the direction of the first directed section in a sequence of directed sections. Yet other example methods and systems select a navigation landmark disposed in a direction that is neither aligned with the direction of the first directed section nor opposite to the direction of the first directed section (e.g., the direction in which the navigation landmark lies can be substantially perpendicular to the direction of the first directed section).

DETAILED DESCRIPTION

General Overview

To users who are en route to a destination, a navigation system of this disclosure can provide relative navigation instructions, i.e., instructions that based on the direction of the movement. Examples of such navigation instructions include "turn left onto Main Street." However, at the beginning of navigation, when the user is stationary and there is no direction of movement yet, absolute directions such as "go North on State Street" may be difficult to use. To generate initial navigation instructions, the navigation system identifies candidate navigation landmarks at the initial location of a portable device within a 360-degree degree of the location. The navigation system then generates initial navigation instructions referencing one or several of these navigation landmarks, without limiting the selection to those navigation landmarks that are disposed in the direction of initial travel.

In some cases, the navigation system generates initial navigation instructions that reference navigation landmarks that will be behind the user once he or she commences travel. For example, the initial navigation instruction can be "walk away from the fountain and toward the hill." Moreover, the one or several navigation landmarks the system selects need not be proximate and can include far-away natural objects such as mountains as well as artificial structures such as bridges, towers, tall buildings, etc. Using crowdsourcing, the navigation system also can identify and reference in initial navigation instructions auditory landmarks, e.g., "walk toward the music" if an outdoor concert is reported at a nearby location.

The navigation landmarks can be permanent or transient. The navigation system can generate various metrics for navigation landmarks, and use the metrics when selecting navigation landmarks for certain location and certain orientation. The metrics can be related to observability, prominence, and uniqueness of navigation landmarks. To assess these factors, the system can utilize machine vision and other automated techniques, crowdsourcing, etc.

Example Computing Environment

Figure 1:
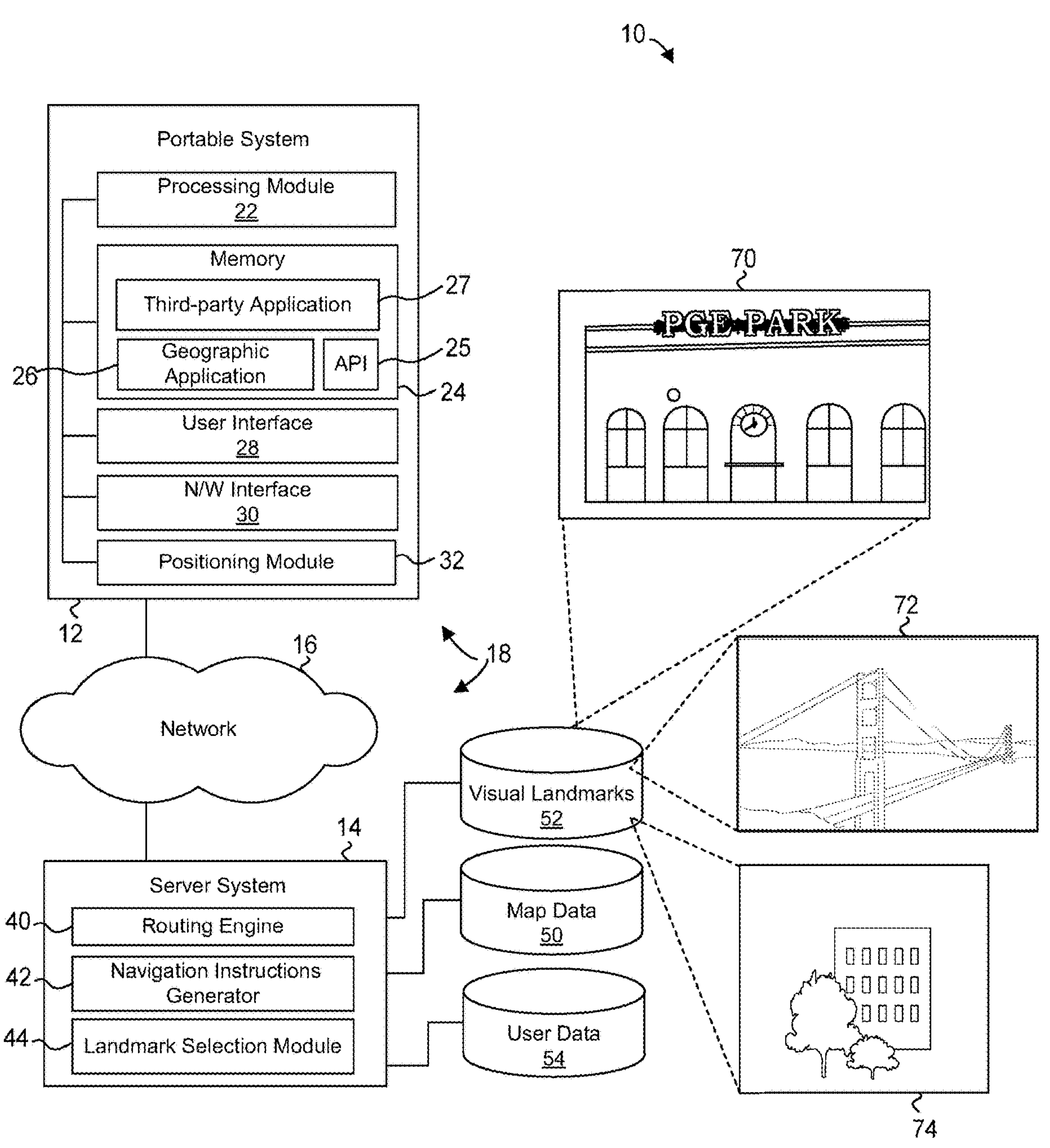
FIG. 1 is a block diagram of an example computing system that generates initial navigation instructions by referencing landmarks perceptible within the 360-degree range of the current location of a portable device, according to one implementation.

FIG. 1 illustrates an environment 10 in which at least some of the techniques for generating initial navigation instructions can be implemented. The environment 10 includes a portable system 12 and a server system 14 interconnected via a communication network 16. The server system 14 in turn can communicate with various databases and, in some implementations, third-party systems such as a live traffic service or a weather service (not shown to avoid clutter). A navigation system 18 operating in the environment 10 includes components configured to select visual and/or auditory landmarks for inclusion in navigation instructions and, in particular, for generating initial navigation instructions. The navigation system 18 can be implemented in the portable system 12, the server system 14, or partially in portable system 12 and partially in the server system 14.

The portable system 12 can include a portable electronic device such as a smartphone, a wearable device such as a smartwatch or a head-mounted display, or a tablet computer. In some implementations or scenarios, the portable system 12 also includes components embedded or mounted in a vehicle. For example, a driver of a vehicle equipped with electronic components such as a head unit with a touchscreen can use her smartphone for navigation. The smartphone can connect to the head unit via a short-range communication link such as Bluetooth® to access the sensors of the vehicle and/or to project the navigation instructions onto the screen of the head unit. In general, modules of a portable or wearable user device, modules of a vehicle, and external devices or modules of devices can operate as components of the portable system 12.

The portable system 12 can include a processing module 22, which can include one or more central processing unit (CPUs), one or more graphics processing unit (GPUs) for efficiently rendering graphics content, an application-specific integrated circuit (ASIC), or any other suitable type of processing hardware. Further, the portable system 12 can include a memory 24 made up of persistent (e.g., a hard disk, a flash drive) and/or non-persistent (e.g., RAM) components. The portable system 12 further includes a user interface 28 and a network interface 30. Depending on the scenario, the user interface 28 can correspond to the user interface of the portable electronic device or the user interface of the vehicle. In either case, the user interface 28 can include one or more input components such as a touchscreen, a microphone, a keyboard, etc. as well as one or more output components such as a screen or speaker.

The network interface 30 can support short-range and/or long-range communications. For example, the network interface 30 can support cellular communications, personal area network protocols such as IEEE 802.11 (e.g., Wi-Fi) or 802.15 (Bluetooth). In some implementations, the portable system 12 includes multiple network interface modules to interconnect multiple devices within the portable system 12 and to connect the portable system 12 to the network 16. For example, the portable system 12 can include a smartphone, the head unit of a vehicle, and a camera mounted on the windshield. The smartphone and the head unit can communicate using Bluetooth, the smartphone and the camera can communicate using USB, and the smartphone can communicate with the server 14 via the network 16 using a 4G cellular service, to pass information to and from various components of the portable system 12.

Further, the network interface 30 in some cases can support geopositioning. For example, the network interface 30 can support Wi-Fi trilateration. In other cases, the portable system 12 can include a dedicated positioning module 32 such as a Global Positioning Service (GPS) module. In general, the portable system 12 can include various additional components, including redundant components such as positioning modules implemented both in the vehicle and in the smartphone.

In the example implementation illustrated in FIG. 1, the memory 24 stores instructions that implement an initial navigation instruction API 25, a geographic application 26, and a third-party application 27. In another implementation, however, the memory 24 stores only the API 25 and the third-party application 27 such as a web browser or a gaming application, which obtains initial navigation instructions with references to navigation landmarks by invoking the API 25 and uses in the initial navigation instructions in the manner specific to the application. In another implementation, the memory 24 stores only the geographic application 26 which obtains the initial navigation instructions and provides these initial navigation instructions via the user interface 28 as part of driving directions, for example. More generally, the memory 24 store the API 25, the geographic application 36, or both.

With continued reference to FIG. 1, the portable system 12 can communicate with the server system 14 via the network 16, which can be a wide-area network such as the Internet. The server system 14 can be implemented in one more server devices, including devices distributed over multiple geographic locations. The server system 14 can implement a routing engine 40, a navigation instructions generator 42, and a landmark selection module 44. The components 40-44 can be implemented using any suitable combination of hardware, firmware, and software. The server system 15 can access databases such as a map database 50, a visual landmark database 52, and a user profile database 54, which can be implemented using any suitable data storage and access techniques.

In operation, the routing engine 40 can receive a request for navigation instructions from the portable system 12. The request can include a source, a destination, and constraints such as a request to avoid toll roads, for example. The request can come from the geographic application 26 or the API 25, for example. The routing engine 40 in response can retrieve road geometry data, road and intersection restrictions (e.g., one-way, no left turn), road type data (e.g., highway, local road), speed limit data, etc. from the map database 50 to generate a route from the source to the destination. In some implementations, the routing engine 40 also obtains live traffic data when selecting the best route. In addition to the best, or "primary," route, the routing engine 40 can generate one or several alternate routes.

In addition to road data, the map database 50 can store descriptions of geometry and location indications for various natural geographic features such as rivers, mountains, and forests, as well as artificial geographic features such buildings and parks. The map data can include, among other data, vector graphics data, raster image data, and text data. In an example implementation, the map database 50 organizes map data into map tiles, which generally correspond to a two-dimensional organization of geospatial data into traversable data structure such as a quadtree.

The navigation instructions generator 42 can use the one or more routes generated by the routing engine 40 and generate a sequence of navigation instructions. Examples of navigation instructions include "in 500 feet, turn right on Elm St." and "continue straight for four miles." The navigation instructions generator 42 can implement natural language generation techniques to construct these and similar phrases, in the language of the driver associated with the portable system 12. The instructions can include text, audio, or both. As discussed in more detail below, the navigation instructions generator 42 and/or software components implemented in the portable system 12 generate initial navigation instructions that reference navigation landmarks in a manner that differs from the navigation instructions provided while the portable device is en route.

The landmark selection module 44 can operate as part of the navigation system 18, which also can include the navigation application 26. The landmark selection module 44 can augment the navigation instructions generated by the navigation instructions generator 42 with references to visual landmarks such as prominent buildings, billboards, traffic lights, stop signs, statues and monuments, and symbols representing businesses. To this end, the landmark selection module 44 can access the visual landmark database 52 to select a set of visual landmarks disposed along the navigation route. The landmark selection module 44 selects one or more landmarks for inclusion in the initial navigation directions in view of additional signals, such as the indication that the portable computing device is at rest. When selecting landmarks for the initial navigation directions, the landmark selection module 44 can apply different selection criteria (e.g., visibility in the 360-degree range), as discussed below.

The visual landmark database 52 can store information regarding prominent geographic entities that can be visible when driving (or bicycling, walking, or otherwise moving along a navigation route) and thus serve as visual landmarks. For each visual landmark, the visual landmark database 52 can store one or several photographs, geographic coordinates, a textual description, remarks submitted by users, and numeric metrics indicative of usefulness of the visual landmark and/or of a particular image of the visual landmark. In some implementations, a landmark-specific record in the visual landmark database 52 stores multiple views of the visual landmark from the same vantage point, i.e., captured from the same location and with the same orientation of the camera. However, the multiple views of the visual landmark can differ according to the time of day, weather conditions, season, etc. The data record can include metadata that specifies these parameters for each image. For example, the data record may include a photograph of a billboard at night when it is illuminated along with a timestamp indicating when the photograph was captured and another photograph of the billboard at daytime from the same vantage point along with the corresponding timestamp. Further, the data record may include photographs of the billboard captured during snowy weather, during rainy weather, during foggy weather, etc., and corresponding indicators for each photograph. Still further, the data record may include photographs captured during different seasons.

In short, the visual landmark database 52 can store a large set of visual landmarks that in some cases is redundant both in terms of the number of landmarks available for the same maneuver (e.g., a billboard on the right and a church on the left near the same intersection) and in terms of imagery available for the same landmark. The navigation system 18 can determine which of the redundant landmarks are useful for particular lighting conditions, weather conditions, traffic conditions (as drivers may find it difficult to recognize certain visual landmarks when driving fast), and how well the corresponding scene is visible from the driver's vantage point (as inferred from real-time imagery).

In addition to multiple images of a same visual landmark, the visual landmark database 52 can store multiple descriptions of the same landmark, such as "the large glass building," "the building with a large 'M' in front of it," "the building with international flags," etc. Operators of the server system 14 and/or users submitting landmark information as part of a crowd-sourcing effort can submit these descriptions, and the server system 14 can determine which description drivers find more helpful using the feedback processing techniques discussed in more detail below. To keep track of drivers' feedback, the visual landmark database 52 in one example implementation stores an overall numeric metric for a visual landmark that can be used to assess whether the visual landmark should be referenced in navigation instructions at all, separate numeric metrics for different times of day, different weather conditions, etc. and/or separate numeric metrics for different images.

To populate the visual landmark database 52, the server system 14 can receive satellite imagery, photographs and videos submitted by various users, street-level imagery collected by cars equipped with specialized panoramic cameras, street and sidewalk imagery collected by pedestrians and bicyclists, crowd-sourced information from users (e.g., "street fair at State & Main"), etc. Similarly, the visual landmark database 52 can receive descriptions of landmarks from various sources such as operators of the server system 14 and people submitting user-generated content. Additionally or alternatively to using crowdsourcing techniques, the server system 14 can utilize 3D reconstruction, computer vision, and other automated techniques to generate numeric metrics of observability, prominence, and uniqueness for potential visual landmarks, and various audio processing techniques to determine similar metrics (e.g., volume, frequency range, distinctiveness) for auditory landmarks. The server system 14 in some implementations uses metrics derived from user-generated content to supplement or correct the automatically generated metrics, for example.

As illustrated in FIG. 1, the visual landmark database 52 can store images 70 of highly distinctive, famous buildings visible at relatively few locations, images 72 of large structures visible from numerous locations, and images 74 of generally inconspicuous buildings that nevertheless may be sufficiently observable, prominent, and unique in a certain setting (e.g., next to multiple smaller buildings).

In another implementation, the visual landmark database 52 stores only references to images in other databases. For example, one or several database can store the images 70, 72 and 74, and various electronic services can use these images for a variety of purposes (such as providing user albums, online photo galleries, virtual tours or supplementing business data). Because these images often are updated, the visual landmark database 52 in this implementation can store only references to the images to avoid redundancy in storage and the delays associated with synchronizing databases. In a similar manner, the visual landmark database 52 can store, for a certain landmark, a reference to the corresponding map data in the map database 50 rather than a copy of the map data.

With continued reference to FIG. 1, the user profile database 54 can store user preferences regarding the types of visual landmarks they prefer to see. For example, the profile of a certain user can indicate that she prefers billboards as landmarks. The landmark selection module 44 can use user preferences as at least one of the factors when selecting visual landmarks from among redundant visual landmarks. In some implementations, the user provides an indication that he or she allows the navigation system 18 to utilize this data. Other factors for selecting visual landmarks from among redundant visual landmarks can include objective metrics, such as the numeric metrics of prominence, observability and uniqueness. In an example implementation, the objective metrics take precedence over user preferences.

In example operation, the portable system 12 generates a request for navigation instructions and transmits the request to the server system 14. The request can include an indication of the current location of the portable system 12 as well as an indication, which can be explicit or implicit, that the portable system 12 currently is at rest. The navigation system 18 determines which navigation landmarks are visible or otherwise perceptible at the current location of the portable system 12, without limiting the selection of navigation landmark to any single direction relative to the current location of the portable system 12.

As indicated above, functionality of the navigation system 18 can be distributed between the portable system 12 and the server system 14 in any suitable manner. In some implementations, for example, the server system 14 can provide indications of multiple landmarks surrounding the current location of the portable system 12, along with the navigation instructions for traveling to the destination, and the geographic application 26 and/or the API 25 can locally format the initial navigation instructions.

Next, example methods for generating initial navigation instructions with navigation landmarks and populating a database with suitable navigation landmark data are discussed with reference to FIGS. 2 and 3, respectively, followed by a discussion of an example interface which the portable system 12 can provide. Additional examples and methods for selecting and providing navigation landmarks in initial navigation are further discussed with reference to FIGS. 5-7.

Example Methods for Generating Initial Navigation Instructions

Figure 2:
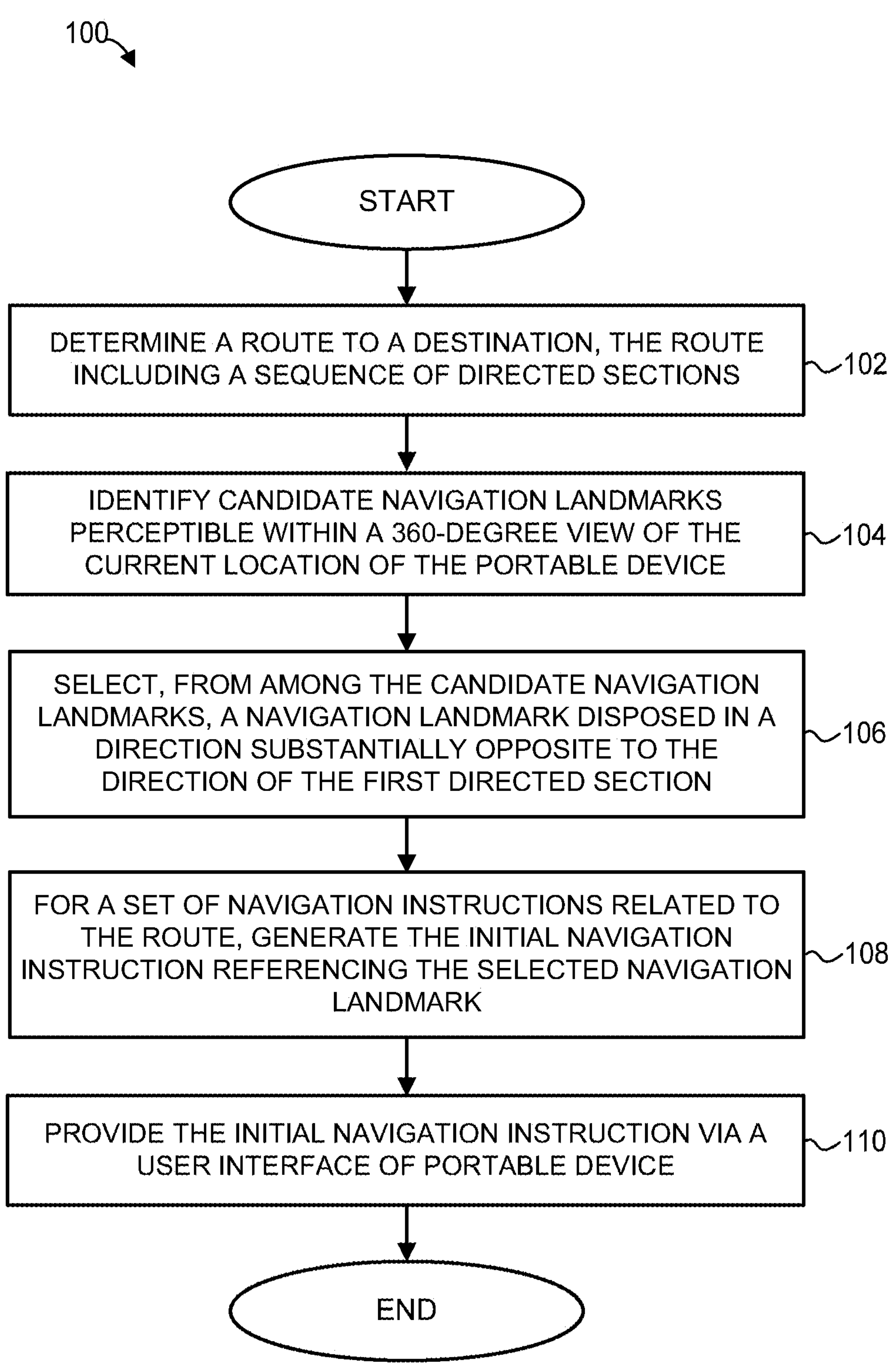
FIG. 2 is a flow diagram of an example method for generating initial navigation instructions for drivers using landmarks perceptible within the 360-degree range, which can be implemented in the system of FIG. 1.

FIG. 2 is a flow diagram of an example method 100 for generating initial navigation instructions for drivers. The navigation system 18 discussed can implement the method 100 as a set of instructions executable on one or more processors, in one or several devices. For example, some or all of the acts that make up the method 100 can be implemented in the modules 40, 42 and 44.

The method 100 begins at block 102, where a route to a destination is determined. For example, a request can be received from a portable device, such as the portable system 12 of FIG. 1, for navigating a user to a certain location from the current location of the portable device. The route can be determined in accordance with any suitable technique in view of road geometry, various road properties such as speed limits and toll requirements, current road conditions, weather, etc. The route can include a sequence of directed sections between waypoints. An example sequence can include the following directed sections: (i) North from the current location at Fifth Ave. and Main to the corner of Ninth and Main, along Main, (ii) West from the corner of Ninth Ave. and Main to the corner of Ninth Ave. and Maple, along Ninth Ave., (iii) South from the corner of Ninth Ave. and Maple for 100 yards along Maple.

At block 104, candidate navigation landmarks perceptible within a 360-degree range of the current location of the portable device are identified. As discussed in more detail with reference to FIG. 3, the database 52 of FIG. 1 or a similar database can store data related to various navigation landmarks that are prominently and uniquely observable from various geographic locations. For example, the database can indicate that for the corner of Fifth Ave. and Main, the prominently and uniquely observable navigation landmarks include City Hall 200 yards North, a railroad bridge one quarter of a mile West, a mountain range far South (e.g., >10 miles), and a fountain 50 yards East.

Next, at block 106, one or several navigation landmarks are selected for inclusion in the initial navigation instructions, and a corresponding initial navigation instruction is generated at block 108. To continue with the example above, the initial directed section in the sequence corresponding to a certain route defines travel North from Fifth Ave. and Main. The initial navigation instructions for this segment can include a reference to the mountain range disposed far South of this starting location. As a more specific example, the initial navigation instructions can include the text "Begin travel away from the mountain range." Further, the initial navigation instructions can reference City Hall, disposed in the opposite direction, and the text can be "Begin travel away from the mountain range and toward City Hall."

The initial navigation instructions can be provided via the user interface visually or in the form of an announcement, at block 110. As illustrated in more detail FIGS. 4A-C, the initial navigation instructions also can be provided in an interactive manner to allow the user to view additional details related to the referenced navigation landmarks. Once the initial navigation instructions are provided to the user in the manner described above, subsequent navigation directions can refer to relative maneuvers, such as "turn left in two blocks at Broadway."

Figure 3:
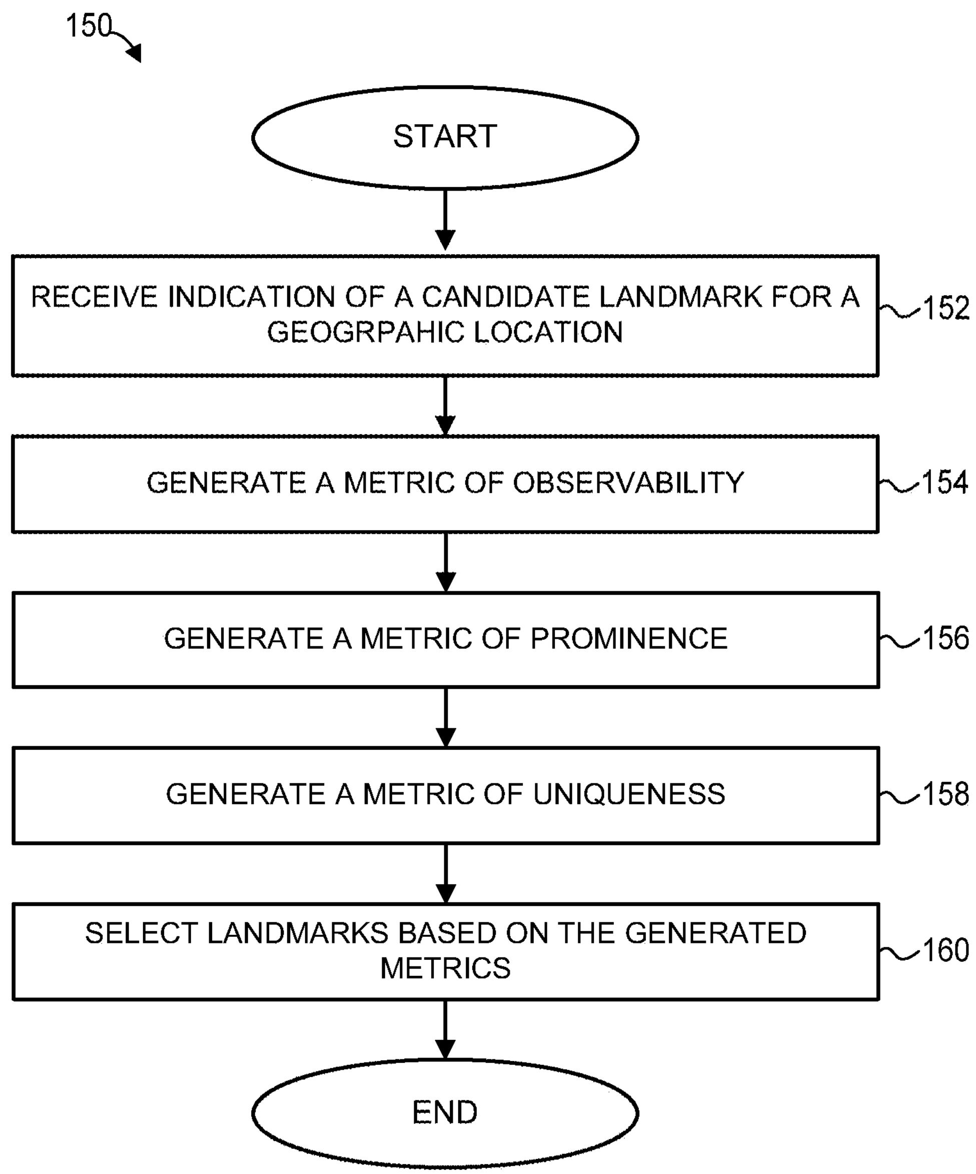
FIG. 3 is a flow diagram of an example method for selecting landmarks for initial navigation directions based on several metrics, which can be implemented in the system of FIG. 1.

Now referring to FIG. 3, an example method 150 for selecting landmarks for initial navigation directions based on several metrics can be implemented in the module 44, for example, as a set of instructions executable on one or more processors. More generally, the method 150 can be implemented in one or several modules, which in some embodiments are distributed among multiple devices or systems. According to some implementations, the method 150 is executed in an offline or batch mode to generate metrics for various candidate navigation landmarks and update the respective database records, for subsequent selection. In other implementations, the method 150 is executed in real time as part of block 106 discussed above with reference to FIG. 2, for example.

At block 152, an indication of a candidate navigation landmark for a certain geographic location is received. For example, for a certain urban location, any identifiable structure in close proximity to the location, any natural geographic feature known to be visible at the location, a source of noise known to be perceptible at the location, etc. Next, at blocks 154-158, various numeric metrics for the candidate navigation landmark can be determined.

At block 154, a metric of observability is determined. As used herein, observability refers to the probability a traveler can locate the navigation landmark without altering his or her position. For example, a fountain that may be concealed from one side of the street may not be consistently observable, and the metric accordingly can be relatively low. Similarly, seasonal or otherwise transient features may not be consistently observable. Accordingly, the observability metric also can be relatively low (or, in some implementation, the observability metric for the appropriate season can be relatively high, and the observability metric for the remaining seasons can be relatively low). In contrast, the observability metric for a large monument in the middle of city square can be assigned a relatively high value for locations in the square.

The numeric value for the metric of observability can be calculated using one or several signals. For example, photographs of a certain landmark can be tagged with the name of the landmark and with pose data (indications of the location or orientation of the camera). A certain number of photographs of the same landmark captured from the same location, as reflected in the pose data, in general are a strong indicator that the navigation landmark should have a high observability metric. Further, three-dimensional (3D) models constructed using scanning, 3D reconstruction from user photographs, panoramic imagery, aerial imagery, etc. can be used to determine line-of-sight for longer distances.

Still further, transient features can serve as navigation landmarks and assigned high metrics of observability for the appropriate periods of time. For example, farmer's markets can be open some days of the week seasonally, and public art installations can be exhibited for a limited time. Referring back to FIG. 1, the map database 50 or a similar database can include a business data for the farmer's market at a certain location. This business data and/or crowd-sourced information related to the farmer's market can be used when generating the metric observability.

At block 156, the module that implements the method 150 determines a metric of prominence for the candidate navigation landmark. To this end, the module can use such signals as an indication of how widely the candidate navigation landmark is photographed or mentioned in various documents. The numeric value for the metric of prominence can be calculated for example by counting the number of indexed photographs of the candidate navigation landmark and/or the number of search hits, reviews, and queries related to the candidate navigation landmark.

Another signal the module can use is indicative of whether the candidate navigation landmark can be easily picked out from among the surrounding elements. As one example, a computer vision feature detector/classifier can attempt to identify the candidate navigation landmark within a photograph of a scene including the candidate navigation landmark, where the photograph is captured at the given geographic location. If the candidate navigation landmark can be identified with high confidence, this can be used as a signal indicative of prominence.

With continued reference to FIG. 3, a metric of uniqueness can be calculated at block 158. To this end, proximity of the candidate navigation landmark to other landmarks can be assessed to determine, for example, whether nearby candidate navigation landmark or points of interest are of the same type (e.g., fountain, traffic signal). Some of the types of points of interest can inherently have expected noteworthiness (e.g., monuments). Other types of points of interest can be expected to be generally similar to each other (e.g., traffic signs).

The metrics determined at blocks 154, 156 and 158 can be weighed in any suitable manner to generate an overall score. At block 160, one or several landmarks can be selected for use with initial navigation instructions in view of the overall score or, if desired, only or two of the metrics determined at blocks 154, 156 and 158.

Example User Interface

Referring back to FIG. 1, geographic application 26 or the third-party application 27 can provide initial navigation instructions via an interactive user interface. One example implementation of this interface is discussed with reference to FIGS. 4A-C. Each of the screenshots 200, 220 and 240 illustrates example output of a software application displayed on a touchscreen of a portable device 201. Although these examples depict a rectangular layout typical for a smartphone or tablet computer, square, circular, oval, and other types of layout can be implemented in generally similar manner for other types of devices such as smart watches or dedicated navigation devices, for example.

Figures 4A, 4B, 4C:
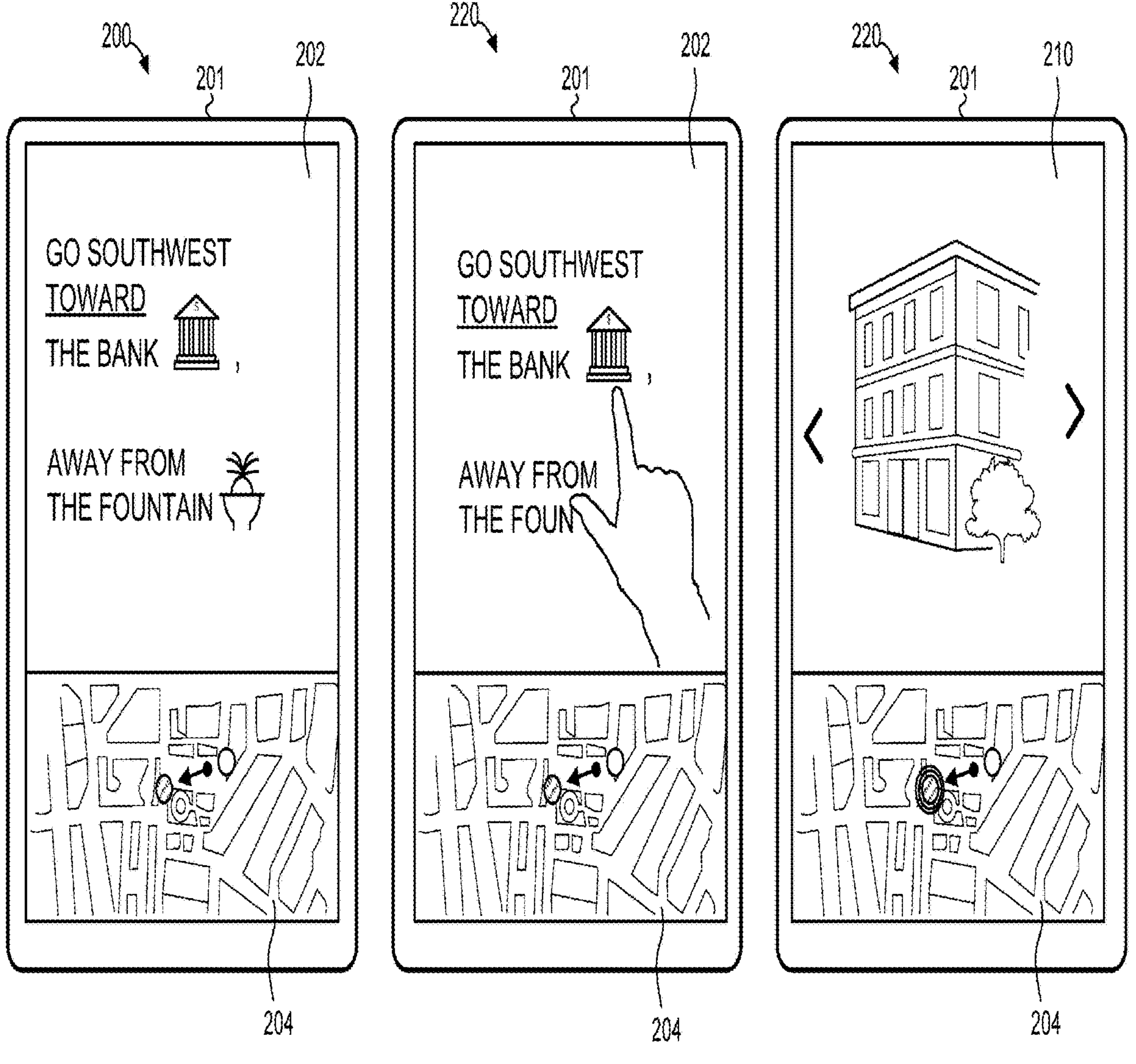
FIGS. 4A-C illustrate several screenshots of an example user interface of the portable device, which a navigation software module of this disclosure can generate to provide initial navigation instructions in an interactive manner.

Referring first to an example screenshot 200 depicted in FIG. 4A, an instruction window 202 partially overlaps a digital map 204, where the initial navigation instruction is illustrated using markers illustrating the current location of the user, the first waypoint, and the direction in which the user should move. As discussed above, it is difficult for the sensors of a portable device to reliably determine the user's orientation when the user is at rest, and accordingly it is difficult to assist the user with aligning the digital map 204 with the user's surroundings. The screenshot 200 can be generated directly in response to the user requesting navigation instructions or, in some implementations, after presenting an overview of the route to the user and in response to the user command to start presenting the sequence of navigation instructions.

The instruction window 202 in this example includes text that references both a navigation landmark (bank) disposed in the direction of travel along the first directed section of the route, and a navigation landmark (fountain) disposed in the opposite direction. Accordingly, the text instructs the user to walk toward the bank and away from the fountain. In some implementations, the digital map 204 is interactive and accessible via a direct contact such as a tap. In response to a tap event detected within the digital map 204, the instruction window 202 can be dismissed.

As illustrated in FIG. 4A, the instruction window 202 can include icons depicting the type of the navigation landmark referenced in the initial navigation instruction. The landmark selection module 44 or another module operating in the system of FIG. 1 can select these icons from a list of available landmark types. The icons can be individually selectable to access additional information regarding the corresponding navigational landmark. Alternatively, the user can choose to dismiss the instruction window 202 to cause the digital map 204 to occupy the entire screen, or in any case a larger portion of the screen.

Referring to FIGS. 4B and 4C, the user can select the icon corresponding to the bank to access an informational screen 210, which can partially overlap the digital map 204 similar to the instruction window 202. The selection of the icon can correspond to a tap event, a double event, or any suitable type of interaction. The informational screen 210 can include a conventional (flat) photograph of the navigation landmark, a panoramic photograph of the navigation landmark, an interactive 3D view of the landmark, or any other available imagery. If desired, the informational screen 210 can also include business data for the navigation landmark.

Figure 5:
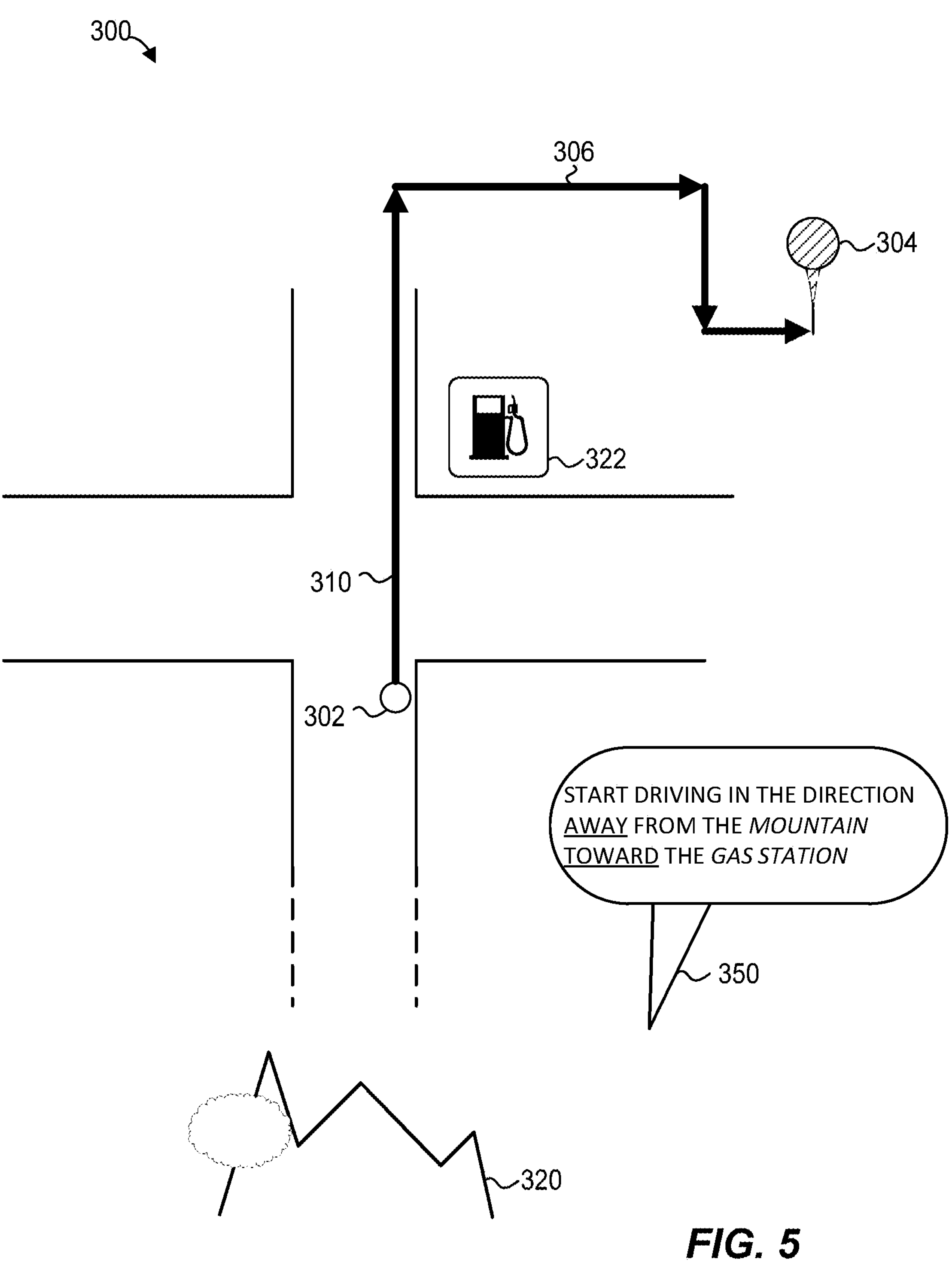
FIG. 5 is a block diagram that schematically illustrates the use of distant and proximate navigation landmarks in generating initial navigation instructions, according to one example implementation of the system of FIG. 1.

Next, a block diagram 300 of FIG. 5 schematically illustrates the use of distant and proximate navigation landmarks in generating initial navigation instructions. In this example scenario, the current location of the portable device is represented by marker 302 and the destination for the navigation instructions is represented by marker 304. A route 306 between the current location and the destination is made up of a sequence of directed sections, including the first directed section 310.

Referring to FIGS. 1 and 5, when the user of the portable system 12 begins navigation along the route 306, the navigation system 18 can generate initial navigation directions that reference a mountain 320, disposed far away from the location 302 (e.g., 40 miles) as well as a gas station 322 is disposed at the same intersection as the location represented by marker 302. More particularly, the navigation system 18 can generate text 350 to instruct the user of the portable system 12 to start driving or walking away from the mountain 320 and toward the gas station 322.

Figure 6:
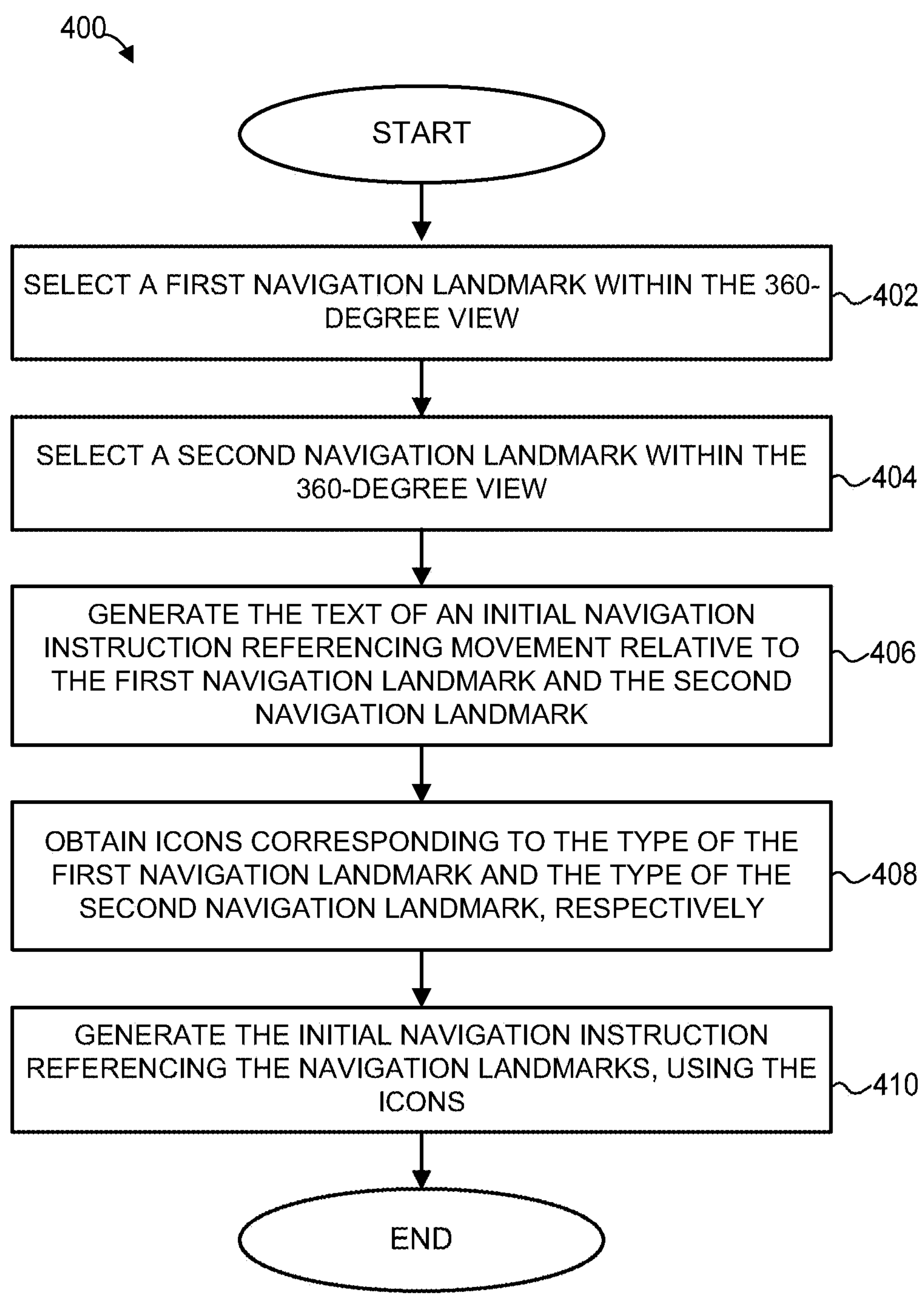
FIG. 6 is a flow diagram of an example method for generating an initial navigation instruction that references two navigation landmarks disposed in different directions relative to the current location of the portable device.

For further clarity, FIG. 6 illustrates an example method 400 for generating an initial navigation instruction that references two navigation landmarks disposed in different directions relative to the current location of the portable device. The method 400 can be implemented in the navigation system 18 discussed above. As a more specific example, the method 400 can be implemented in the navigation instructions generator 42 as a set of instructions stored on a computer-readable medium and executable by one or more processors.

At block 402, a first navigation landmark is selected within the 360-degree range in view of the metrics of observability, prominence and uniqueness discussed above. User preferences (e.g., "use billboards when available," "do not use auditory landmarks") also can be used to select from among multiple candidates. In general, the first navigation landmark can be selected in any direction relative to the direction of the first one of the sequence of directed sections. For example, the first navigation landmark can lie on the left-hand side relative to the direction of travel. In the example scenario discussed above with reference to FIGS. 4A-C, the bank disposed in the general direction serves as the first navigation landmark. In the example scenario discussed above with reference to FIG. 5, the mountain serves as the first navigation landmark.

Although the initial navigation instructions can include a reference to only one landmark, the method 400 can include selecting a second navigation landmark within the 360-degree range at block 404. The first and second navigation landmarks can be disposed in different directions relative to the initial direction of travel. At block 406, the text of an initial navigation instruction referencing movement relative to the first navigation landmark and the second navigation landmark is generated. The movement can be away from the first navigation landmark and toward the second navigation landmark, for example. In some implementations, the text is generated according to the template "travel <direction> from <the first navigation landmark> to <the second navigation landmark>."

At block 408, icons corresponding to the type of the first navigation landmark and the second navigation landmark are selected. As illustrated in FIGS. 4A-C, the icons can operate as selectable controls for retrieving additional information regarding the navigation landmarks. An initial navigation instruction using the text generated at block 406 and the icons obtained at block 408 is generated (block 410). The initial navigation instruction then can be provided to the portable system for display or otherwise for output via the user interface.

Updating Navigation Landmark Database

Figure 7:
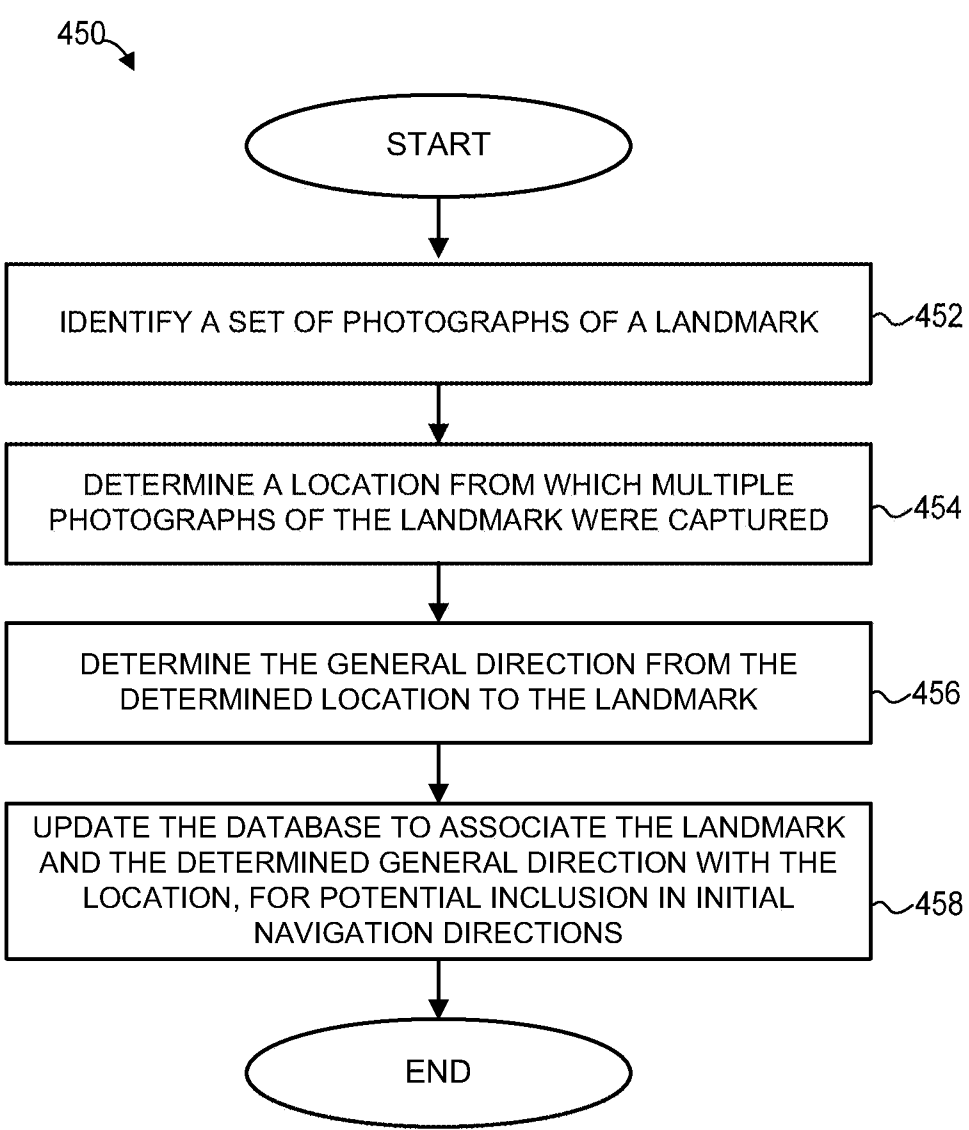
FIG. 7 is a flow diagram of an example method for identifying locations that can serve as navigation landmarks for an initial navigation instruction, using photographs captured from certain locations.

FIG. 7 is a flow diagram of an example method 450 for identifying locations that can serve as navigation landmarks for an initial navigation instruction, using photographs captured from certain locations. Referring back to FIG. 1, the method 450 can be implemented in the landmark selection module 44, for example, as one of the techniques for populating the visual database 52. The method 450 can be implemented as a set of instructions stored on a computer-readable medium and executed by one or more processors.

Referring to FIG. 7, a set of photographs of a landmark is identified at block 452. For example, a large number of people may share their photographs of the National Gallery of Art building in Washington, D.C., and many label ("tag") their photographs with the title "National Gallery of Art." Moreover, many of these users share indications of the locations from which their photographs were captured.

At block 454, a location from which multiple photographs of the landmark were captured is determined. For example, the photographs of the National Gallery of Art building can be clustered at certain locations from which people tend to capture photographs. As a more specific example, of 1,000 example photographs 40% may be captured at a first intersection, another 30% may be captured at a second intersection, and the remaining photographs may be spread around multiple other locations. Accordingly, at block 454, the first and second intersections may be selected as locations from which this landmark is visible.

At block 456, the respective directions from the first and second intersections to the National Gallery of Art building are determined using map data. At block 458, a database (such as the database 52 of FIG. 1) is updated to indicate that at the first intersection, the National Gallery of Art building is a candidate navigation landmark, disposed in a certain direction from the first intersection. Similarly, the database cam be updated to indicate that this building also is a candidate navigation landmark at the second intersection, disposed in the corresponding direction. The navigation system 18 of FIG. 1 subsequently can use these stored indications when selecting candidate navigation landmarks.

More generally, the navigation system 18 also employ a variety of techniques for populating the database 52. Examples of such techniques include receiving indications from organizers regarding temporary exhibitions, street fairs, music festivals, etc. occurring at certain locations, or receiving similar indications from users in accordance with crowd-sourcing techniques to obtain indications of temporary events. For auditory landmarks, users can report sources of sound above a certain noise level, so that the navigation system 18 can generate initial navigation instructions of the type "walk away from the subway stop toward the music."

Additional Considerations

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a cloud computing environment or as a software as a service (SaaS). For example, at least some of the operations may be performed by a group of computers (as examples of machines including processors), these operations being accessible via a network (e.g., the Internet) and via one or more appropriate interfaces (e.g., application program interfaces (APIs).)

Upon reading this disclosure, those of ordinary skill in the art will appreciate still additional alternative structural and functional designs for the systems for generating initial navigation directions. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing initial navigation guidance, the method comprising:

determining, by one or more processors, a route from a current location of a portable device to a destination, the route including a sequence of directed sections;

generating, by the one or more processors, navigation instructions to guide a user of the portable device along the route to the destination, including, in response to determining that the portable computing device is at rest at the current location:

identifying candidate navigation landmarks perceptible within a 360-degree range of the current location of the portable device using (i) one or more metrics of observability, prominence, and uniqueness and (ii) a user preference related to a type of landmark, selecting, from among the candidate navigation landmarks, a navigation landmark, and generating an initial instruction in the navigation instructions, the initial instruction referencing the selected navigation landmark; and causing the initial navigation instruction to be provided via a user interface of the portable device.

2. The method of claim 1, wherein the one or more metrics include a metric of observability; the method further comprising:

generating the metric of observability for a candidate navigation landmark based on a number of photographs of the candidate navigation landmark captured from a same location.

3. The method of claim 1, wherein the one or more metrics include a metric of observability; the method further comprising:

generating the metric of observability for a candidate navigation landmark using one or more of (i) three-dimensional (3D) models constructed using scanning, (ii) 3D reconstruction from user photographs, (ii) panoramic imagery, or (iv) aerial imagery.

4. The method of claim 1, wherein the one or more metrics include a metric of prominence; the method further comprising:

generating the metric of prominence for a candidate navigation landmark using a number of indexed photographs of the candidate navigation landmark and/or a number of search hits, reviews, and queries related to the candidate navigation landmark.

5. The method of claim 1, wherein the one or more metrics include a metric of uniqueness; the method further comprising:

generating the metric of uniqueness for a candidate navigation landmark using proximity of the candidate navigation landmark to other landmarks of a same type.

6. The method of claim 1, wherein the selected navigation landmark is a first navigation landmark, and wherein generating the navigation instructions further includes:

selecting, from among the candidate navigation landmarks, a second navigation landmark disposed in a direction opposite to a direction of the first navigation landmark from the current location of the portable device, and generating the initial instruction referencing the first navigation landmark and the second navigation landmark.

7. The method of claim 6, wherein generating the initial instruction includes using a format "travel <direction> from <the first navigation landmark> to <the second navigation landmark>".

8. The method of claim 6, wherein generating the initial instruction further includes:

selecting, for each of the first navigation landmark and the second navigation landmark, a first icon and a second icon, respectively, each icon indicating a type of the landmark, annotating the initial instruction with the first icon and the second icon.

9. The method of claim 1, wherein identifying the candidate navigation landmarks includes identifying an auditory navigation landmark corresponding to a source of an audio signal above a noise floor.

10. The method of claim 1, wherein identifying the candidate navigation landmarks includes identifying a transient navigation landmark corresponding to a temporary geolocated event.

11. A system comprising:

processing hardware;

a non-transitory memory readable by the processing hardware and storing thereon instructions that, when executed by the processing hardware, cause the system to:

determine a route from a current location of a portable device to a destination, the route including a sequence of directed sections, generate navigation instructions to guide a user of the portable device along the route to the destination, including, in response to determining that the portable computing device is at rest at the current location:

identify candidate navigation landmarks perceptible within a 360-degree range of the current location of the portable device using (i) one or more metrics of observability, prominence, and uniqueness and (ii) a user preference related to a type of landmark, select, from among the candidate navigation landmarks, a navigation landmark, generate an initial instruction in the navigation instructions, the initial instruction referencing the selected navigation landmark; and cause the initial navigation instruction to be provided via a user interface of the portable device e.

12. The system of claim 11, wherein the one or more metrics include a metric of observability; and wherein the instructions further cause the system to:

generate the metric of observability for a candidate navigation landmark based on a number of photographs of the candidate navigation landmark captured from a same location.

13. The system of claim 11, wherein the one or more metrics include a metric of observability; and wherein the instructions further cause the system to:

generate the metric of observability for a candidate navigation landmark using one or more of (i) three-dimensional (3D) models constructed using scanning, (ii) 3D reconstruction from user photographs, (ii) panoramic imagery, or (iv) aerial imagery.

14. The system of claim 11, wherein the one or more metrics include a metric of prominence; and wherein the instructions further cause the system to:

generate the metric of prominence for a candidate navigation landmark using a number of indexed photographs of the candidate navigation landmark and/or a number of search hits, reviews, and queries related to the candidate navigation landmark.

15. The system of claim 11, wherein the one or more metrics include a metric of uniqueness; and wherein the instructions further cause the system to:

generate the metric of uniqueness for a candidate navigation landmark using proximity of the candidate navigation landmark to other landmarks of a same type.

16. The system of claim 11, wherein the selected navigation landmark is a first navigation landmark, and wherein to generate the navigation instructions, and wherein the instructions further cause the system to:

select, from among the candidate navigation landmarks, a second navigation landmark disposed in a direction opposite to a direction of the first navigation landmark from the current location of the portable device, and generate the initial instruction referencing the first navigation landmark and the second navigation landmark.

17. The system of claim 16, wherein the instructions cause the system to generate the initial instruction in a format "travel <direction> from <the first navigation landmark> to <the second navigation landmark>".

18. The system of claim 16, wherein to generate the initial instruction, the instructions cause the system to:

select, for each of the first navigation landmark and the second navigation landmark, a first icon and a second icon, respectively, each icon indicating a type of the landmark, annotate the initial instruction with the first icon and the second icon.

19. The system of claim 11, wherein to identify the candidate navigation landmarks, the instructions cause the system to identify an auditory navigation landmark corresponding to a source of an audio signal above a noise floor.

20. The system of claim 11, wherein to identify the candidate navigation landmarks, the instructions cause the system to identify a transient navigation landmark corresponding to a temporary geolocated event.

* * * * *